United States Patent
Fauran et al.

[11] 3,922,280
[45] Nov. 25, 1975

[54] PHARMACOLOGICALLY ACTIVE 4,8-DIMETHOXY-FURO (3′,2′-F)BENZOXAZOL-2-YL ACETHYDROXAMIC ACID

[75] Inventors: Claude P. Fauran, Paris; Jeannine A. Eberle, Chatou; Guy M. Raynaud, Paris; Bernard M. Pourrias, Meudon La Foret, all of France

[73] Assignee: Delalande S.A., Courbevoie, France

[22] Filed: Feb. 14, 1974

[21] Appl. No.: 442,757

[30] Foreign Application Priority Data
Feb. 19, 1973  France .............................. 73.05816

[52] U.S. Cl... 260/307 D; 260/346.2 R; 260/482 R; 424/272
[51] Int. Cl.² ....................................... C07D 498/14
[58] Field of Search ................................ 260/307 D

[56] References Cited
FOREIGN PATENTS OR APPLICATIONS
1,087,779   10/1967   United Kingdom OTHER PUBLICATIONS
Wagner et al., "Synthetic Organic Chemistry," 1953, Wiley and Sons, Inc., New York, p. 569.

Primary Examiner—Raymond V. Rush
Attorney, Agent, or Firm—Woodhams, Blanchard and Flynn

[57] ABSTRACT

A compound of the formula

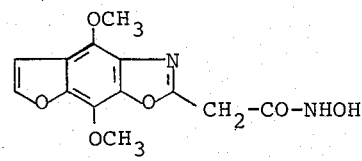

is prepared by condensing 4-amino-3-hydroxy-2,5-dimethoxy benzofuran with ethyl iminomalonate hydrochloride to form the intermediate 2-ethoxycarbonylmethyl-4,8-dimethoxy-furo(3′,2′-f) benzoxazole and then reacting the intermediate with hydroxylamine hydrochloride. The first-mentioned compound possesses vasodilatatory, antibronchoconstrictive, anticholinergic, antihistaminic, antiserotonic, antibradykinine, hypotensive, peripheral vasodilatatory and cardiac analeptic properties.

1 Claim, No Drawings

PHARMACOLOGICALLY ACTIVE 4,8-DIMETHOXY-FURO (3',2'-F)BENZOXAZOL-3-YL ACETHYDROXAMIC ACID

The present invention relates to 4,8-dimethoxy-furo (3',2'-f) benzoxazol-2-yl acethydroxamic acid, its process of preparation and its therapeutic application.

The novel acid according to the invention corresponds to the following formula:

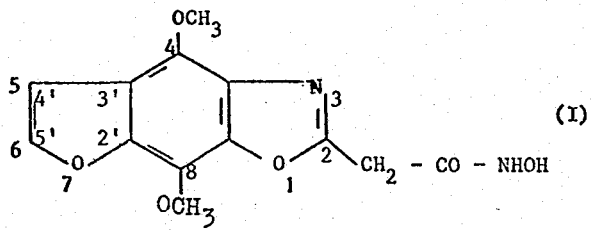

The process according to the invention consists of:
in a first stage, condensing 4-amino-3-hydroxy-2,5-dimethoxy benzofuran of formula II, with ethyl iminomalonate hydrochloride of formula III:

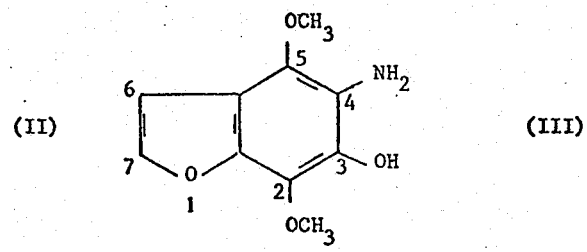

to form 2-ethoxycarbonylmethyl-4,8dimethoxy-furo (3',2'-f) benzoxazole of formula IV:

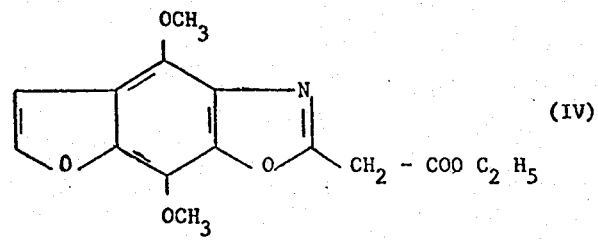

and in a second stage, reacting in sodium methanolate, hydroxylamine hydrochloride of formula: $NH_2OH$, HCl with the derivative of formula IV.

The compound of formula II is obtained by heating under reflux for 24 hours in 2N hydrochloric ethanol, 5-acetamido-6-hydroxy-4,7-dimethoxybenzofuran, which results from hydroxylation of 4,8-dimethoxy-2-methyl-furo (3',2'-f) benzoxazole, itself prepared by subjecting khellinone oxime to the Beckmann rearrangement.

The following preparation is given by way of example, to illustrate the invention.

EXAMPLE

4,8-dimethoxy-furo (3',2'-f) benzoxazol-2-yl acethydroxamic acid a. Preparation of 5-amino-6-hydroxy-4,7-dimethoxy benzofuran 1st. stage: 5-acetamido-6-hydroxy-4,7-dimethoxy benzofuran (Code No. 70244)

0.2 mol of khellinone oxime is placed in suspension in 250 ml of acetic acid saturated with hydrochloric acid gas. The suspension is warmed to 90°–95°C for ¼ hour, diluted with 800 ml of water and the temperature of the reaction mixture is maintained at 50°C for 1 hour. The solution obtained is then cooled to 0°–5°C, filtered and the compound obtained is recrystallised from methanol.

Melting point = 160°C; yield = 75%; empirical formula = $C_{12}H_{13}NO_5$.

| Elementary analysis: | C | H | N |
|---|---|---|---|
| Calculated% | 57.37 | 5.22 | 5.88 |
| Found% | 57.15 | 5.17 | 5.69 |

2nd stage: 5-amino-6-hydroxy-4,7-dimethoxy benzofuran. (Code No. 70344)

0.88 mol of 5-acetamido-6-hydroxy-4,7-dimethoxybenzofuran in suspension in 1.75l of 2N hydrochloric ethanol is heated under reflux for 24 hours.

The amide is rapidly solubilised and a clear brown solution is obtained. After 24 hours the solution is diluted

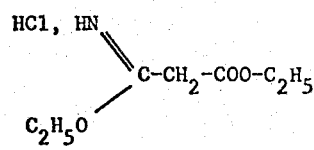

with 1l of water, the ethanol is removed, and any amide which has not reacted is removed by extraction with ethyl acetate.

The solution is neutralised to pH 4 with 2N soda, added dropwise with good agitation. 5-amino-6-hydroxy-4,7-dimethoxybenzofuran is obtained which may be recrystallised from water, but which is utilised as such in the following synthesis.

Melting point = 131°C; yield = 80%; empirical formula = $C_{10}H_{11}NO_4$.

| Elementary analysis: | C | H | N |
|---|---|---|---|
| Calculated% | 57.41 | 5.30 | 6.70 |
| Found% | 57.66 | 5.33 | 6.87 | b. Preparation of 4,8-dimethoxy-furo(3',2'-f) benzoxazol-2-yl acethydroxamic acid (Code No. 71315)

1st stage: 2-ethoxycarbonylmethyl-4,8-dimethoxy-furo (3',2'-f) benzoxazole. (Code No: 70 417)

A mixture of 0.025mol of 4-amino-3-hydroxy-2,5-dimethoxybenzofuran, 0.025 mol of ethyl iminomalonate hydrochloride and 12ml of anhydrous ethanol is maintained under reflux for 2 hours. The precipitate of $NH_4Cl$ formed is separated and the filtrate is evaporated to dryness. The residue is taken up in chloroform and washed with water. The product obtained by evaporation is recrystallised from ethanol in the presence of animal-black.

Melting point = 58°C; yield = 58%; empirical formula = $C_{15}H_{15}NO_6$.

Elementary analysis:

|  | C | H | N |
|---|---|---|---|
| Calculated% | 59.01 | 4.95 | 4.59 |
| Found% | 59.11 | 4.85 | 4.70 |

2nd stage: 4,8-dimethoxy-furo (3',2'-f) benzoxazol-2-yl acethydroxamic acid.

0.23 mol of hydroxylamine hydrochloride in solution in 220ml of anhydrous methanol is added to a solution of sodium methanolate prepared from 0.49 atom of sodium and 100ml of anhydrous methanol. The precipitate of NaCl formed is filtered off and 0.23 mol of 2-ethoxycarbonylmethyl-4,8-dimethoxy-furo (3',2'-f) benzoxazole is added to the filtrate. The mixture is maintained under reflux for 1½ hours. The product obtained by evaporation is solubilised in 300ml of water, and is then acidified with concentrated HCl. The precipitate formed is filtered and recrystallised in the presence of animal-black from a ethanol-dimethylformamide mixture, in ratio of 9:1 by volume.

Melting point = 213°C; yield = 51%; empirical formula = $C_{13}H_{12}N_2O_6$.

Elementary analysis:

|  | C | H | N |
|---|---|---|---|
| Calculated% | 53.42 | 4.14 | 9.59 |
| Found% | 53.62 | 4.12 | 9.66 |

The compound of formula (I) has been tested on animals in the laboratory and has been shown to possess vasodilatatory, antibronchoconstrictive and anticholinergic antihistaminic, antiserotonic, antibradykinine, hypotensive, peripheral vasodilatatory and cardiac analeptic properties.

1. Vasodilatatory properties

The compound of formula (I) is capable of augmenting the flow of the coronary vessels of the isolated heart of a guinea-pig, when said compound is added in the perfusion liquid of said organ.

Thus, in a dose of 2.5μg/ml in the perfusion liquid, it augments by 60% the flow of the isolated heart.

2. Antibronchoconstrictive, anticholinergic, antibradykinine, antihistaminic and antiserotonic properties Injected by intraveinous means, the compound of formula (I) is capable of opposing the bronchoconstriction provoked in the guinea-pig by the intraveinous injection of acetylcholine, bradykinine, histamine or serotonine. The antibronchoconstrictive effect is evaluated by the Konzett method.

There is listed in the following Table the results obtained by administration of the compounds of formula (I).

TABLE

| Broncho-constrictural Agent | Dose administered of compound of formula I (mg/kg/i.v.) | Percentage reduction of bronchoconstriction (%) |
|---|---|---|
| histamine | 0.9 | 50 |
| serotonine | 1 | 50 |
| acetylecholine | 2.5 | 50 |
| bradykinine | 0.5 | 50 |

In addition, the compound of formula (I), in a does of 50μg/ml permits a relaxation of 100% of the isolated tracheal chain, contracted by histamine.

3. Hypotensive properties

Administered by intraveinous means to an anaesthetised cat, the compound of formula (I) causes a lowering of the arterial pressure.

Thus, administered in a dose of 8mg/kg/i.v. the compound of formula (I) permits a reduction of 50% in the arterial pressure of an anaesthetised cat, which lasts for 20 minutes.

4. Peripheral vasodilatatory properties

The compound of formula (I), administered by intra-arterial means in a dose which will not affect the arterial pressure, provokes an augmentation of flow of the femoral artery, the level of which is effectuated by the injection, in an anaesthetised dog with femoral carotid anastomosis, the measure being effectuated by a rotameter situated at the level of the derivation.

In an indicative manner, the administration of 100μg/kg/i.a. of the compound of formula (I) produces, for two minutes, an augmentation of 100% of the femoral flow.

5. Cardiac analeptic properties

The compound of formula (I) is capable of augmenting the force of contractions of the isolated left auricle of an electrically stimulated guinea-pig.

Thus, in a concentration of 10μg/ml in the conserving liquid, it permits an augmentation of 160% the force of contractions of left auricle of a electrically stimulated guinea-pig.

In addition, administered to a dog by intraveinous means, the compound of formula (I) augments the amplitude of the frequency of cardiac contractions.

Thus, the administration of 20mg/kg/i.v. of the compound of formula (I), produce, for 35 minutes, an augmentation of 55% of the cardiac frequency and, for 15 minutes, an augmentation of 55% of the cardiac amplitude.

Finally, as no mortality has been observed following the administration of 2g/kg/p.o. of the compound of formula (I), the difference between the lethal dose and the pharmacologically active doses is sufficiently great to permit the compound of the formula (I) be utilised in therapeutics.

The compound of formula (I) is useful in the treatment of circulatory insufficiencies, asthma, hypertension, visceral spasms, gastroduodenal ulcers, allergies and migraines.

It is administered by oral means in the form of tablets, gelules or dragees containing 25 to 400mg of active ingredient (1 to 6 times per day), in the form of drinkable drops in doses of 0.05 to 2% (10 to 100 drops — one to three times a day), by parenteral means in the form of injectable ampoules containing 0.25 to 20mg of active ingredient (1 to 4 times a day) and by rectal means in the form of suppositories containing 25 to 200mg of active ingredient (1 or 2 times a day).

Accordingly, the present invention also provides a therapeutic composition comprising the compound of the formula (I) together with a therapeutically-acceptable carrier.

What we claim is:

1. 4,8-dimethoxy-furo (3',2'-f)benzoxazol-2-yl acethydroxamic acid having the formula:

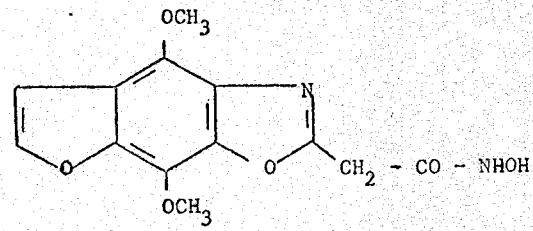

* * * * *